Oct. 15, 1940.   J. W. GILLON   2,218,236
LIGHT MEASURING APPARATUS FOR ENLARGERS
Filed Sept. 10, 1938   2 Sheets-Sheet 1
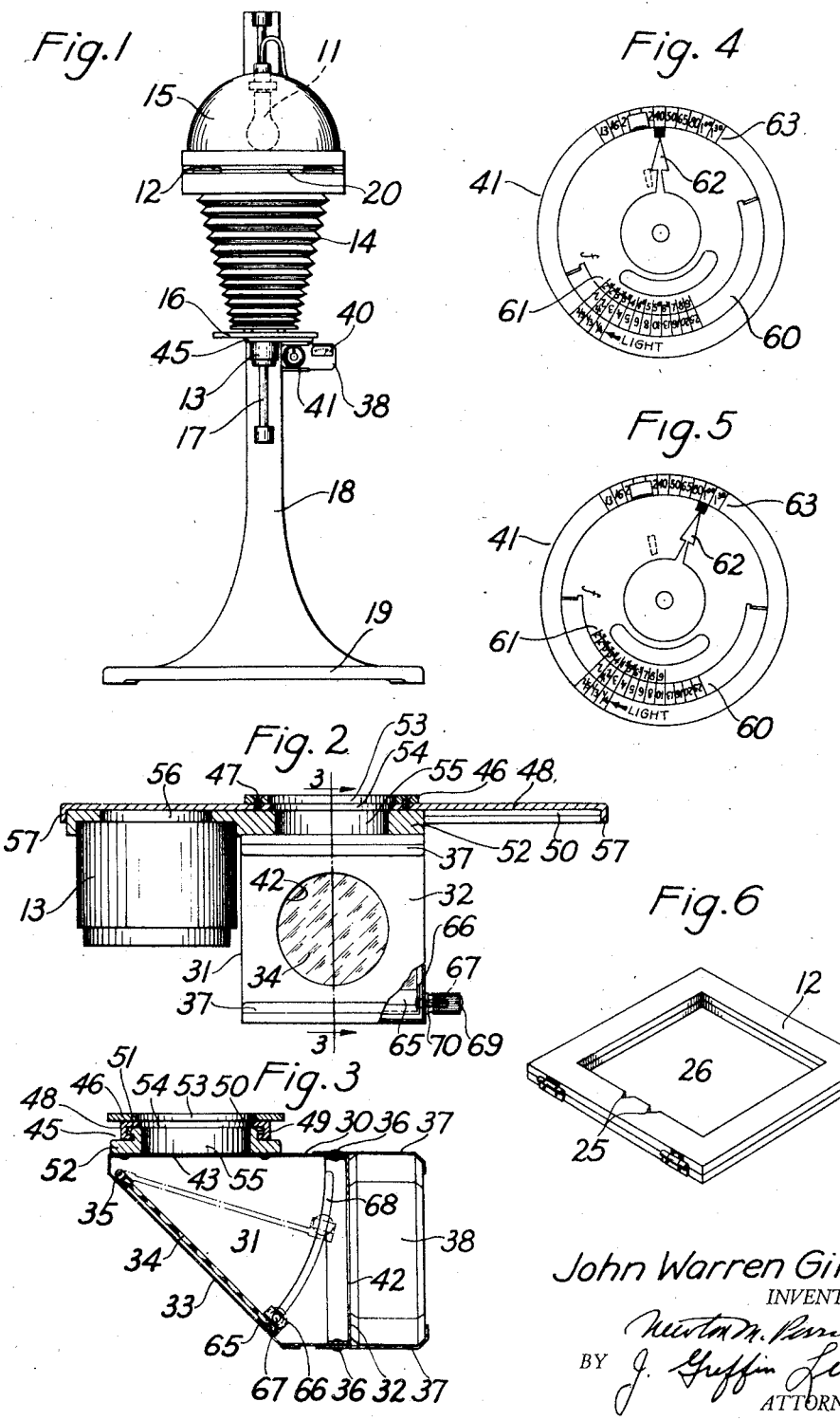
John Warren Gillon
INVENTOR
BY Newton M. Burns
J. Griffin Little
ATTORNEYS Oct. 15, 1940.    J. W. GILLON    2,218,236
LIGHT MEASURING APPARATUS FOR ENLARGERS
Filed Sept. 10, 1938    2 Sheets-Sheet 2
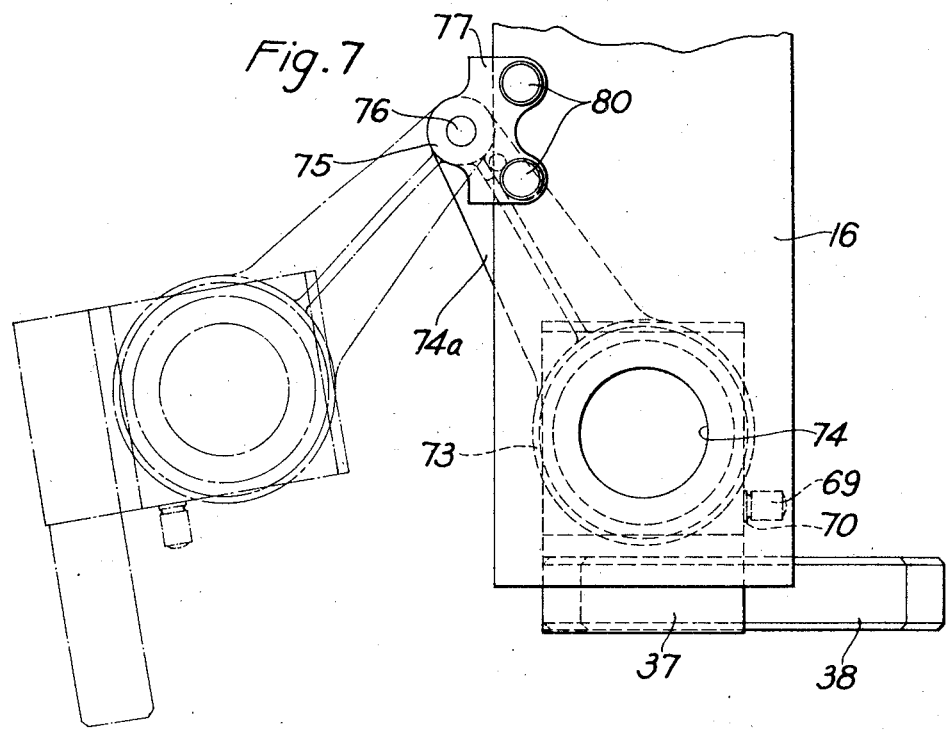
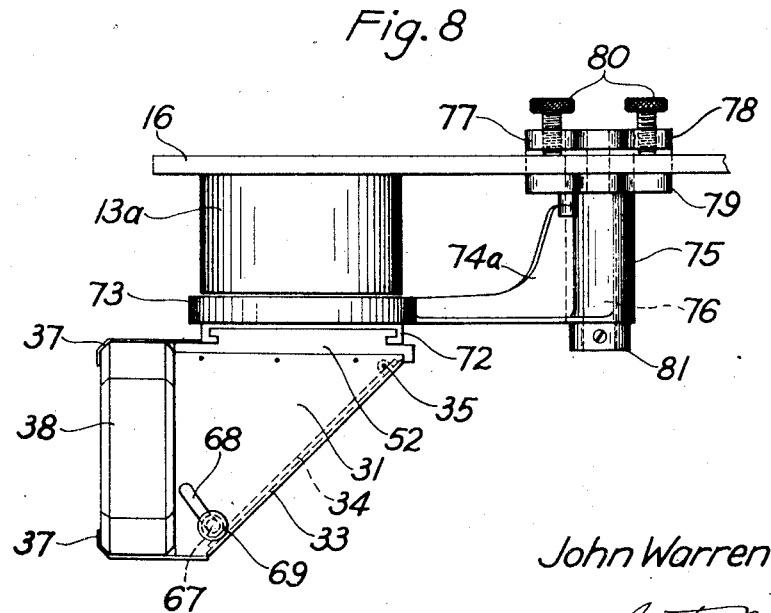
John Warren Gillon
INVENTOR
ATTORNEYS Patented Oct. 15, 1940

2,218,236

UNITED STATES PATENT OFFICE 2,218,236

LIGHT MEASURING APPARATUS FOR ENLARGERS

John Warren Gillon, Rochester, N. Y., assignor to Eastman Kodak Company, Rochester, N. Y., a corporation of New Jersey Application September 10, 1938, Serial No. 229,360

11 Claims. (Cl. 88—24)

The present invention relates to photographic enlarging cameras, and more particularly to an auxiliary apparatus for measuring the quantity of light transmitted by negatives mounted in the enlarger.

One object of the invention is the provision of a light measuring apparatus which may be adjusted to compensate for variations in the sizes of the negatives to be printed.

Another object of the invention is the provision of a measuring apparatus, of the class described, which facilitates the rapid printing of negatives of different densities and/or sizes.

A further object of the invention is the provision, in such an apparatus of a light collecting member which may be adjusted so as to direct equal quantities of light onto a light sensitive element irrespective of the negative size so as to secure equal meter readings for all negatives of equal densities.

Still another object of the invention is the provision of a measuring device which can be readily moved into measuring position, and, after such measurements are made, may be quickly moved to an inoperative position to permit ready printing of the negatives.

A still further object of the invention is the provision of a light measuring and exposure control apparatus which is simple in design, comprises few parts of rugged construction, easy to operate, and accurate in its results.

To these and other ends, the invention resides in certain improvements and combinations of parts, all as will be hereinafter more fully described, the novel features being pointed out in the claims at the end of the specification.

In the drawings:

Fig. 1 is a front elevation view of an enlarger, showing the relation thereto of a light transmission measuring device or apparatus constructed in accordance with the present invention;

Fig. 2 is a front elevation view, with parts in section and parts in elevation, of a light measuring apparatus constructed in accordance with one embodiment of the invention, showing the relation of the various parts;

Fig. 3 is a vertical sectional view taken substantially on line 3—3 of Fig. 2, showing the arrangement for varying the photoelectric meter reading to compensate for negatives of different sizes;

Fig. 4 is a view of the scales or dials on the photoelectric meter, showing an adjustment for determining the exposure time for a negative of one density;

Fig. 5 is a view similar to Fig. 4, showing the scale or dial setting for a negative of a different density;

Fig. 6 is a perspective view of the preferred form of film holder, showing the arrangement by which the degree of enlargement can be quickly and readily ascertained;

Fig. 7 is a plan view of a modified light measuring apparatus for use with enlargers having large lenses, showing the mounting by which the apparatus may be swung into operative position below the lens; and Fig. 8 is a side elevation view of the measuring apparatus illustrated in Fig. 7 showing the arrangement of the various parts.

Similar reference numerals throughout the various views indicate the same parts.

The present invention relates broadly to a device or apparatus for determining the exposure time of negatives to be printed in enlarging cameras. This apparatus comprises, in general, a photoelectric meter mounted adjacent the projecting lens of an enlarger, and a mirror adapted to be positioned in the path of the light or image bearing rays transmitted by the negative, and to reflect these rays onto a light sensitive element formed in the back of the photoelectric meter. The total quantity of light incident upon the light sensitive element is indicated on an indicating scale formed on the front face of the meter. With a known magnification, and light scale reading, the dials on the meter are suitably adjusted to ascertain the correct exposure time for the particular negative being measured. The mirror is pivotally mounted so as to control the quantity of light which falls on the light sensitive element to compensate for negatives of different sizes, all as will be later described. The photoelectric meter illustrated in the present embodiment is a Weston photoelectric meter, model 650.

Fig. 1 shows an enlargement camera of a standard construction, which comprises, in general, a lamp 11, a negative holder 12 positioned below the lamp, and a projecting lens 13 spaced from the holder 12, and connected thereto by an expansible bellows 14. A suitable reflecting hood 15 is positioned over the lamp 11. The lens 13 is carried by a lens board 16 secured to the lower end of the bellows 14 in any suitable and well-known manner. The entire camera is carried by a rod 17 secured to a vertical standard 18 extending upwardly from the support or base 19. Light rays from the lamp 11 pass through a negative 20 positioned in the holder 12, and these light rays are then projected by the lens 13 onto a paper easel positioned on the base 19, to form an enlarged image of the negative, all of which is well known to those in the art.

In order to secure enlargements of satisfactory quality, it is common practice to first make a series of test strips for each negative to determine the proper printing time therefor. If, however, either the degree of enlargement, or the grade of paper is changed, new test strips must be again made, as is well known. Such a procedure is not only time consuming, but is quite costly. In order to overcome these disadvantages, the present invention provides a light measuring apparatus which enables the exposure time to be readily and quickly ascertained, thus materially increasing the output of an enlarger, while, at the same time, securing enlarged prints of uniform and satisfactory quality.

To facilitate the quick and accurate determination of the degree of enlargement, the film holder 12 is formed with a pair of spaced notches 25 arranged on one edge of the holder aperture 26, see Fig. 6. These notches are spaced a definite distance apart, say 1 inch, so that when the image of the negative 20 is projected onto the easel, the distance between the images of the notches 25 may be quickly measured with an ordinary ruler to definitely and accurately determine the degree of enlargement.

A light measuring apparatus constructed in accordance with one embodiment of the invention is illustrated in Figs. 1, 2, and 3. This apparatus comprises, in part, a housing of any suitable material, preferably sheet metal, formed to provide a top wall 30, side walls 31, a front 32, and an inclined bottom 33, which connects the top 30 and the front 32, as clearly shown in Fig. 3. The bottom 33 affords a support for an inclined mirror 34 which is hinged along one edge at 35 to the bottom 33, as clearly shown in Fig. 3. The purpose of this hinged mirror arrangement will be later explained. The mirror housing has secured thereto, by rivets 36, or other suitable fastening means, a pair of forwardly extending resilient clips or fingers 37, adapted to receive and detachably hold a photoelectric meter 38 of the type known as the Weston photoelectric meter, model 650. The mirror housing with its clips 37, form, in effect, a supporting bracket for the photoelectric meter 38.

This meter is formed with a light sensitive element, not shown, upon which light rays may be directed. The total light incident upon this sensitive element is indicated on a meter scale 40 formed on the front face of the meter 38, as clearly shown in Fig. 1. The front face of the meter 38 also carries a series of dials, generally indicated by the numeral 41 and to be later more fully described.

The light sensitive element of the meter 38 is positioned in registry with a circular opening 42 formed in the front wall 32 of the housing. The opening 42 is arranged in optical alignment with the mirror 34 and a similar opening 43 formed in the top 30. By means of this arrangement the light rays transmitted by the negative 20 may be collected by the mirror 34 and reflected onto the light sensitive element of the meter 38, the scale 40 then indicating the total quantity of light incident upon the sensitive element. While a Weston model 650 photoelectric meter has been shown, this is for the purpose of illustration only as it is contemplated that various other forms of well-known meters may be used.

The above-described light measuring apparatus is preferably positioned in the vicinity of the projection lens 13, see Fig. 1. However, when small lenses are used, sufficient light does not pass through the lens to give satisfactory reading on the light meter. Therefore, in order to secure desirable results, the lens 13 is removed and the measuring apparatus is substituted therefor so as to accurately measure the total light transmission of the negative 20 positioned in the holder 12. However, in order to facilitate the quick interchange of lens and measuring apparatus, the present invention provides an arrangement by which both the lens and the apparatus are carried on an adapter, generally indicated by the numeral 45, slidably mounted on the lens board 16. By means of this arrangement, either the lens or the measuring apparatus may be selectively slid into operative position, thus effecting a minimum transfer time between negative integration and projection.

To this end, the lens board 16 has secured to the lower side thereof, in any suitable and well known manner, a plate 46 which, in turn, is fastened by screws 47 to an inverted-dish-shaped plate 48 whose side walls 49 are formed to provide grooves 50 adapted to receive ribs 51 formed on a member 52 secured to the top 30, all as shown in Figs. 2 and 3. As the plates 46 and 48 are stationary, they may be broadly considered as part of the lens board 16 on which the member 52 is slidably mounted. The plates 46 and 48 are formed with apertures 53 and 54 respectively which register with an aperture, not shown, in the lens board 16 to enable the image bearing rays of the negative 20 to reach the lens 13.

The member 52, on the other hand, is formed with an opening 55 in registry with the opening 43 in the top 30, so that when the measuring device is positioned as shown in Fig. 2, the light transmitted by the negative 20 will be collected by the mirror 34 and reflected thereby onto the photoelectric meter 38 to measure the total light transmission of the negative. The lens 13, however, is positioned in an opening 56 formed in the member 52 so that when the latter is slid to the right, as viewed in Fig. 2, the lens will register with the openings 53 and 54 to project the negative image onto the paper easel. The ends 57 of the plate 48 are turned down to provide stops to limit the movement of the member 52, as is apparent from an inspection of Fig. 2. By means of this arrangement the light measuring apparatus may be quickly and easily moved into operating position without necessitating removal of the lens 13, the advantages of which will be obvious to those in the art.

In use, test strips of a negative 20 are made at some known magnification, say, for example, 4, the lens 13 then being in the position shown in Fig. 1. When a print of satisfactory quality is secured, the exposure time is noted. For purpose of illustration, this exposure time is designated as five seconds. The member 52 is then shifted to the left, as viewed in Fig. 2, to move the lens 13 out of projecting position and to simultaneously bring the light measuring apparatus into registry with the openings 53 and 54 of the lens board. In this position, the mirror 34 collects the total light transmitted by the negative 20, and reflects this light onto the meter 38. The reading on the scale 40 is then noted, in the present illustration this scale reading being taken at 40.

The effective speed of the printing paper may now be determined on the computation scales or dials 41 of the meter 38, by aligning the printing time of five seconds, on the lower scale 60, opposite the magnification of 4, F scale 61, and pointing the arrow 62 to the meter reading of 40 on the upper scale 53, all as shown in Fig. 4. Once the effective speed of a given batch of paper is thus determined, the correct printing time for any negative at any magnification can be readily and easily ascertained. For example, if another negative of the same size but of different density is placed in the holder 12, and a meter reading of 100 is secured on the meter 40, with a magnification of 7, then by setting the arrow 62, Fig. 5, opposite the reading of 100 on the scale 63, the exposure time of six seconds is then read on the scale 60 opposite the magnification of 7 on the F scale 61. Thus prints from negatives of the same size but different densities can be quickly made.

It is well known to those in the art, that, in order to secure prints of uniform quality, all negatives of the same density irrespective of size, must be given the same exposure. It is apparent however that as the meter 38 measures the total light transmission of the negatives, the reading on the scale 40 would be higher for a larger negative than for a smaller one of the same density. Obviously it will be necessary to recalibrate the paper speed, as above described, for each negative size. However, in order to eliminate such recalibration, the present invention provides a simple and novel arrangement which compensates for variations in negative sizes so that equal meter readings are secured for all negatives of equal densities regardless of negative size.

To secure this highly desirable result, the mirror 34 is pivoted at 35 to the bottom 34, as above described. The measuring apparatus is then calibrated as follows: An empty holder 12 for the smallest size negative, say 2 x 2, is placed in the enlarger. The measuring apparatus is then positioned as shown in Fig. 2, and the light rays of the lamp 12 pass through the holder aperture 26, no film being in the holder, and are reflected by the mirror 34 onto the meter 38. The reading on the scale 40 is then noticed. This reading may be assumed for purpose of illustration to be 250. This reading then becomes a basic reading.

Now when larger negatives are to be printed, say a 4 x 4, the larger holder, without a negative, is first positioned within the enlarger. The light rays from the lamp 12 then pass through the larger opening in the 4 x 4 holders and give a much higher reading on the scale 40 by reason of the fact that the meter 38 measures the total light passing through the holder aperture. The mirror 34 is then tilted about its pivot 35, as shown in dotted lines in Fig. 3, to decrease the total quantity of light reflected onto the meter 38 until the reading of the scale 40 is again brought back to the reading 250 secured with a 2 x 2 holder, the magnification being of course held constant. The mirror 34 is then locked in its adjusted position, in a manner to be presently described. The exposure time for the larger negatives can then be determined in the same manner as above described.

With the mirror thus properly adjusted for the size negative to be printed, a constant meter reading will thus be secured for all negatives of equal density irrespective of the negative size. This constant meter reading will, with the same magnification, give the same exposure time on the scale 60, which result is that required for prints of satisfactory quality. By means of this arrangement, the negative size, which formerly was a variable, is now made a constant, and thus greatly facilitates the printing of negatives of different sizes as well as densities.

The lower edge of the mirror 34, as viewed in Fig. 3, has secured thereto a U-shaped clip 65, one end of which is turned up to form a lug 66 positioned adjacent one side wall 31 of the mirror housing, as best shown in Fig. 2. This lug 66 has secured thereto a laterally projecting stud 67 which extends through an arcuate shaped slot 68 formed in the adjacent side wall 31. The outer end of the lug is threaded to receive a finger knob 69, the inner end of which is formed with a shoulder 70. When the mirror 34 has been adjusted, as shown in Fig. 3 and above described, the knob 69 is moved inwardly along the stud 67 until the shoulder 70 tightly engages and grips the side 31 to secure, clamp and lock the mirror in adjusted position.

The above described light measuring apparatus has been shown in connection with a small projection lens 13. In such an arrangement the lens is necessarily moved out of operative position during the measuring or light integrating operations, in the manner above described. When, however, large projection lenses are used, sufficient light passes through the lens and it is not, therefore, necessary to remove the lens during the light measuring or integrating operations. Figs. 7 and 8 show a modified arrangement of the light measuring apparatus, above described, for use in connection with large projection lenses 13a. Parts corresponding with those shown in Figs. 1 and 2 will be designated by the same numerals and need not be again described.

The lens 13a is mounted directly onto the lens board 16 in the usual and well-known manner. As sufficient light passes through the lens 13a, the latter need not be removed or displaced during the light measuring operation. On the contrary, the apparatus may be swung into measuring position below the lens 13a, as shown in Fig. 7, to integrate the total transmission of the light passing through the negative 20 and the lens 13a. Obviously, with the measuring apparatus in this below-the-lens position, the meter reading will be different from that found with the apparatus positioned as shown in Fig. 1. Therefore, with the arrangement shown in Figs. 7 and 8, the paper speed, as well as the adjustment for variations of negative sizes, must be carried out in the manner described in connection with Figs. 1 and 2.

During the measuring operation, the measuring apparatus with its pivoted mirror and photoelectric meter 38 are swung into operative position below the lens 13a, as shown in Fig. 8. However, during the projection operation, the measuring apparatus is moved to an inoperative position, as shown in broken lines Fig. 7. In order to permit such movement of the measuring apparatus, the member 52, Figs. 7 and 8, is secured, as shown in Fig. 8, to an apertured plate 72, somewhat similar to plate 48, secured to and depending from an annular ring 73 formed with an aperture 74 adapted to be brought into registry with the lens 13a when the measuring apparatus is in the position shown in Fig. 8. The ring 73 is carried by and preferably formed integral with one end of an arm 74a the other end of which is formed with a tubular sleeve 75 loosely mounted on a stud 76 carried by and depending from a bracket, generally indicated by the numeral 77.

The bracket is formed with a pair of spaced bifurcated members 78 and 79 arranged on opposite sides of the lens board 16, as clearly shown in Fig. 8. A pair of clamping screws 80 extend through the member 78 and engage the lens board 16 to detachably secure the measuring apparatus and its supporting member to the lens board, as is apparent from inspection of Fig. 8. The sleeve 75 is held in position on the stud 76 by means of a collar 81 pinned or otherwise secured to the lower end of the sleeve 76. Thus by swinging the arm 74a about the stud 76, the measuring apparatus may be moved either to its light measuring position as shown in Fig. 8, or to an inoperative position shown in broken line Fig. 7.

It is thus apparent from the above description, that the present invention provides a light measuring apparatus by which the light transmission of a negative may be quickly, easily and accurately determined. From the light transmission indication, the exposure time may be easily and quickly determined. Furthermore the pivoted mirror may be adjusted to compensate for negatives of different sizes so as to insure constant readings on the photoelectric meter for negatives of equal density irrespective of negative sizes. By means of this arrangement, prints of satisfactory and uniform quality are secured from negatives which differ in size and/or density.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

I claim:

1. In a photographic printing apparatus, the combination with a printing lamp, a negative arranged in front of said lamp to be printed by light rays therefrom, of a light sensitive element for measuring the light transmission of said negative, a meter operatively connected to said element, light collecting means adapted to be positioned in the path of image bearing rays transmitted by said negative and to direct said rays onto said element, a unitary support for said element, said meter and said means, and means on said support for adjusting said collecting means to vary the quantity of the image rays incident upon said element to compensate for variations in negative sizes.

2. In a photographic printing apparatus, the combination with a printing lamp, a negative arranged in front of said lamp to be printed by light rays therefrom, of a light sensitive element for measuring the light transmission of said negative, a meter operatively connected to said element, light collecting means adapted to be positioned in the path of image bearing rays transmitted by said negative and to direct said rays onto said element, a unitary support for said element, said meter and said means, means on said support for adjusting said collecting means to vary the quantity of the image rays incident upon said element to compensate for variation in negative sizes, and means for locking said adjusting means in adjusted position.

3. In a photographic printing apparatus, the combination with a printing lamp, a negative holder positioned in front of said lamp, said holder having an opening through which light rays from said lamp may pass, of a light sensitive element for measuring the quantity of said rays, a meter operatively connected to said element, a moveable light collecting member adapted to be positioned in the path of said rays to direct the latter onto said element, a support for said element, said meter and said member, and means for moving said collecting member to vary the quantity of said rays incident upon said element whereby equal meter readings are secured for various size holder openings.

4. In a photographic printing apparatus, the combination with a printing lamp, a negative holder positioned in front of said lamp, said holder having an opening through which light rays from said lamp may pass, of a light sensitive element for measuring the quantity of said rays, a meter operatively connected to said element, a movable light collecting member adapted to be positioned in the path of said rays to direct the latter onto said element, a support for said element, said meter and said member, means for moving said collecting member to vary the quantity of said rays incident upon said element whereby equal meter readings are secured for various size holder openings, and locking means for said collecting member.

5. In a photographic printing apparatus, the combination with a printing lamp, a negative holder positioned in front of said lamp, said holder having an opening through which light rays from said lamp may pass, of a light sensitive element for measuring the quantity of said rays, a meter operatively connected to said element, a reflecting light collecting member adapted to be positioned in the path of said rays to direct the latter onto said element, a support for said element, said meter and said member, means on said support for pivotally mounting said member along one edge thereof, means secured to another edge of said member to move the latter about its pivot to vary the total quantity of light rays directed onto said element so as to secure equal meter readings for different sizes of holder openings, and means for locking said member in adjusted position.

6. In a photographic printing apparatus, the combination with a printing lamp, a negative holder positioned in front of said lamp, said holder having an opening through which light rays from said lamp may pass, of a light sensitive element for measuring the quantity of said rays, a meter operatively connected to said element, an inclined mirror adapted to be positioned in the path of said rays to direct the latter onto said element, a support on which said element and said meter are positioned, a mirror housing formed on said support, means on said housing for pivotally mounting said mirror along one edge, means secured to another edge of said mirror to move the latter about its pivot to vary the total quantity of light rays incident upon said element to provide equal meter readings for various size holder openings, and means on said moving means cooperating with said housing for locking said mirror in adjusted position.

7. In an enlarging camera the combination with a printing lamp, an apertured negative holder positioned in front of said lamp, a projecting lens spaced from said holder and arranged to receive light rays passing through the aperture of said holder, a support for said lens, of a bracket secured to and carried by said support, a light sensitive element for measuring the total quantity of said light rays, a meter operatively connected to said element, means for detachably mounting said element and said meter on said bracket, said bracket being formed to provide a housing, an inclined mirror pivotally mounted within said housing, said support being movable to bring said mirror into the path of said rays to direct the latter onto said element to measure the total quantity of said rays, and means for moving said mirror about its pivot to vary the quantity of light rays directed onto said element.

8. In an enlarging camera the combination with a printing lamp, a negative image positioned in front of said lamp and adapted to be projected by the light rays thereof, a lens board spaced from said negative, of a plate slidably mounted on said board, a projecting lens carried by said plate and secured in an opening formed therein, a housing secured to and depending from said plate, a photoelectric element, spring clips formed on said housing for detachably securing said element thereto, an inclined mirror positioned within said housing, said plate and said housing being formed with openings in optical alignment with said element and said mirror, said plate being movable relative to said lens board to bring said mirror into the path of the light rays transmitted by said negative to reflect the light rays onto said element, means for moving said mirror about a horizontal axis to vary the quantity of light directed onto said element, and means cooperating with said housing for holding said mirror in adjusted position.

9. In an enlarging camera the combination with a printing lamp, a negative image positioned in front of said lamp and adapted to be projected by the light rays thereof, a lens board spaced from said holder, of a plate slidably mounted on said board, a projecting lens carried by said plate and secured in an opening formed therein, a housing secured to and depending from said plate, a photoelectric element, spring clips formed on said housing for detachably securing said element thereto, an inclined mirror positioned within said housing, said plate and said housing being formed with openings in optical alignment with said element and said mirror, an inclined bottom on said housing for supporting said mirror in one position, means for pivotally mounting said mirror along one edge to said bottom, said plate being movable relative to said lens board to bring said mirror into the path of said light rays to reflect the latter onto said element to measure the quantity of said rays, means secured to the opposite edge of said mirror to move the latter about its pivot to direct equal quantities of light onto said element with different sizes of negatives, and means on said last means engaging said housing to lock said mirror in its adjusted position.

10. In an enlarging camera the combination with a printing lamp, a negative image positioned in front of said lamp, to be projected by the light rays thereof, a lens board spaced from said holder, a projecting lens carried by said board, of an arm swingably mounted on said board, a housing secured to and depending from said arm, a light sensitive element carried by said housing, and light directing member positioned within said housing and on the optical axis of said element, said arm being movable to bring said directing member in alignment with the optical axis of said lens so that said member may direct the light rays passing through said lens onto said element to measure the total quantity of said rays.

11. In an enlarging camera the combination with a printing lamp, a negative image positioned in front of said lamp, to be projected by the light rays thereof, a lens board spaced from said holder, a projecting lens carried by said board, of an arm swingably mounted on said board, a housing secured to and depending from said arm, a light sensitive element carried by said housing, an inclined mirror positioned within and pivotally mounted on said housing, said arm being movable relative to said lens board to position said mirror beneath and in alignment with said lens to reflect the light rays passing therethrough onto said element to measure the quantity of said rays, and means for moving said mirror relative to said housing to direct equal quantities of light onto said element for different sizes of negative images.

JOHN WARREN GILLON.